United States Patent [19]
Roth

[11] 4,206,535
[45] Jun. 10, 1980

[54] LOADER FOR GEAR BURNISHING MACHINE

[75] Inventor: Robert G. Roth, East Detroit, Mich.

[73] Assignee: Anderson-Cook, Inc., Frasier, Mich.

[21] Appl. No.: 13,852

[22] Filed: Feb. 22, 1979

[51] Int. Cl.² .................. B21C 37/30; B21D 7/04
[52] U.S. Cl. ........................................ 29/90 B; 72/88
[58] Field of Search ............... 29/90 R, 90 B, 159.2; 72/88, 90

[56] References Cited
U.S. PATENT DOCUMENTS 4,080,699   3/1978   Anderson ........................ 29/90 B

*Primary Examiner*—Harrison L. Hinson
*Attorney, Agent, or Firm*—Reising, Ethington, Barnard, Perry & Brooks

[57] ABSTRACT

A loader (10) for a gear burnishing machine includes a gear carrier (144) and a guide embodied by a rack (122) for cooperating to move a gear to be burnished into meshing relationship with a gear rack of the burnishing machine. A hopper (22) including a feed mechanism provides feeding of the gears to the carrier. Carrier movement moves the gears from the hopper to the machine as the guide rack aligns the gear teeth for meshing with the gear rack teeth. A retaining shaft of the carrier captures the gears between spaced retainers of the carrier as the gears move to the machine for burnishing. A retaining member (66) and a movable dog (84) of the feed mechanism cooperate in feeding gears to the carrier. After burnishing, an actuator including a pusher (204) moves the burnished gear off the guide to a delivery unit 14 including an inclined ramp (198).

19 Claims, 6 Drawing Figures

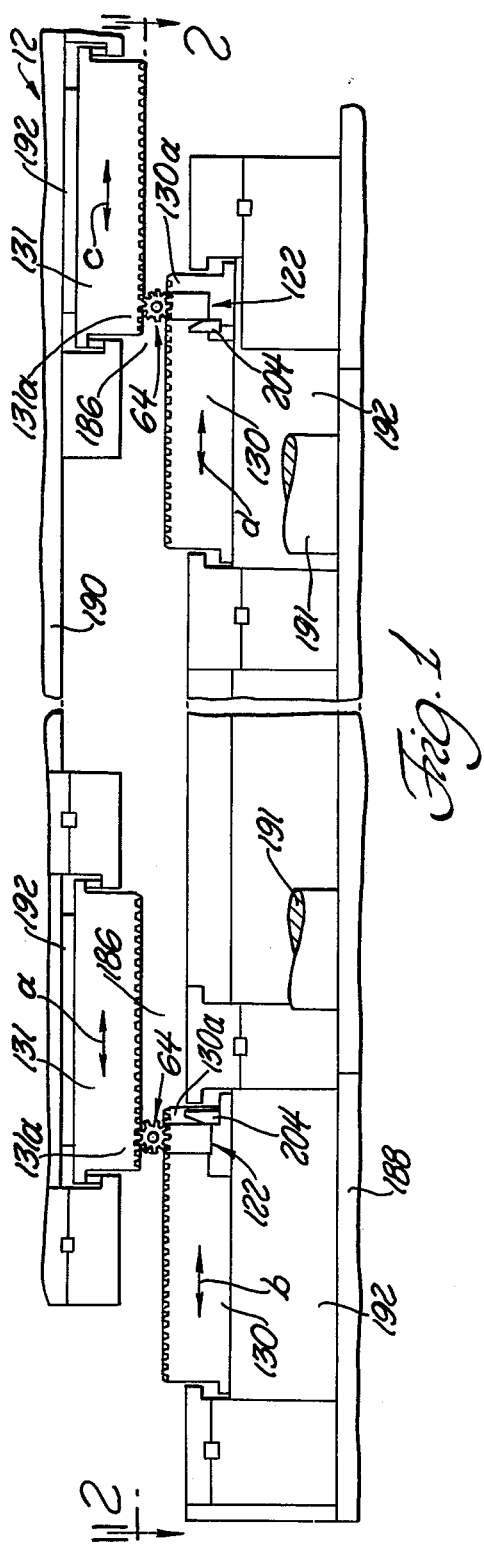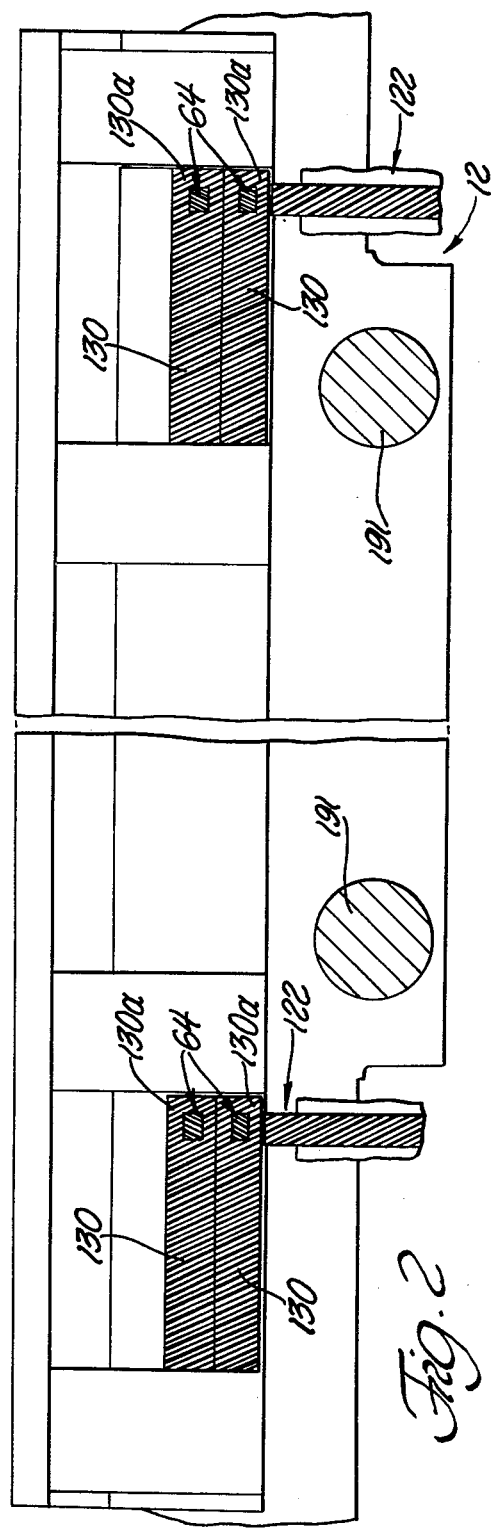

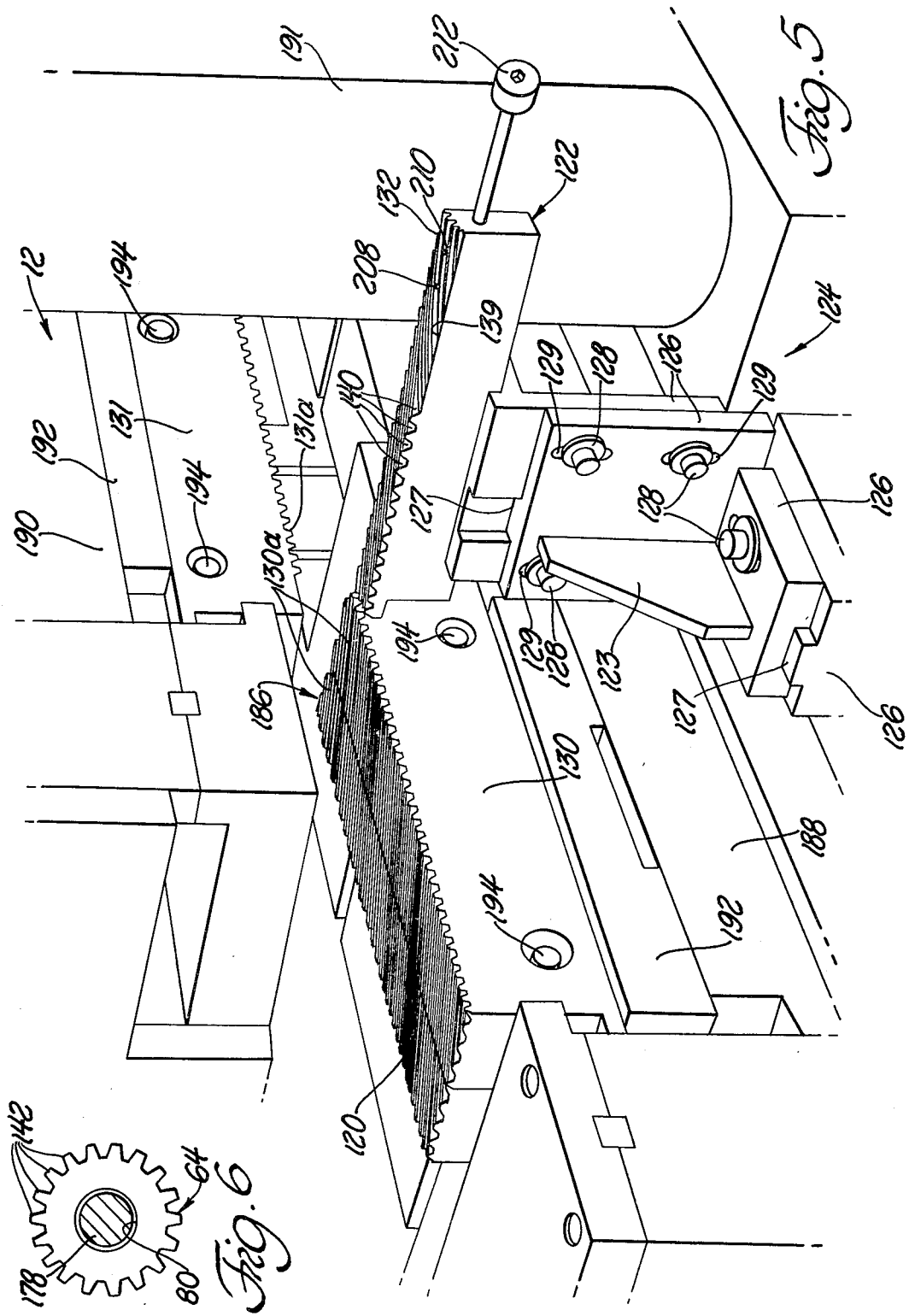

LOADER FOR GEAR BURNISHING MACHINE

TECHNICAL FIELD

This invention relates to loaders for gear burnishing machines having elongated gear racks wherein the gears to be burnished are loaded in a load position and then moved to a start position between the gear racks so as to provide meshing thereof with one of the gear racks of the burnishing machine.

BACKGROUND ART

Conventional gear burnishing machines include toothed rotary tools supported in a spaced relationship relative to each other to receive a toothed gear that is rotatably supported on a pair of work spindles about an axis parallel to the axes about which the tools rotate. Driving of one or more of the tools meshes the tool teeth with the gear teeth so that pressure applied therebetween causes the harder teeth of the tools to remove surface defects from the softer gear teeth. Removal of the surface defects on the burnished gears lengthens their useful lifetime and also mitigates gear noise during use.

In order to have high production capacity burnishing machines must include suitable mechanism for loading and unloading gears. The work spindles that rotatably support the gears during the burnishing are conventionally supported for movement so as to perform the loading and unloading of the gears. Automatic conveyors have also been utilized to feed gear burnishing machines and receive burnished gears therefrom after being operated on by the machines.

Conventional apparatus like that described above is disclosed in U.S. Pat. Nos. 1,993,605; 2,736,238; 2,830,712; 2,860,763; 3,315,541; 3,354,782; 3,587,816; 3,590,982; and 3,958,685.

U.S. Pat. No. 4,080,699, which is assigned to the assignee of the present invention, discloses a burnishing machine wherein a pair of elongated gear racks are moved in opposite directions relative to each other with a toothed gear therebetween such that the meshing of the rack and gear teeth provides the sole support for the gear as the gear teeth are burnished by the rack teeth. This machine utilizes a movable gripper mechanism that positions gears to be burnished between the gear racks in a meshing relationship with one of the racks ready for a burnishing cycle.

DISCLOSURE OF INVENTION

An object of the present invention is to provide an improved loader for gear burnishing machines including a guide for engaging the teeth of a gear moved by a carrier of the loader during carrier movement from a hopper to a start position between the gear racks of a burnishing machine so as to provide meshing thereof with one of the gear racks of the burnishing machine.

Another object of this invention is to provide an improved loader for a gear burnishing machine including a guide rack having a guiding face with teeth spaced therealong for meshing with the teeth of a gear carried on a carrier which moves the gear to be burnished from a hopper to a start position between gear racks of the machine so as to mesh with one of the gear racks.

A further object of the invention is to provide a loader for a gear burnishing machine including a carrier having a pair of spaced retainers between which a toothed gear is fed from a hopper such that movement of the carrier moves the gear while allowing the gear to rotate during movement to a start position as the teeth of the gear are engaged by a guide which orients the gear for meshing with one of a pair of gear racks of the burnishing machine.

Yet another object of the invention is to provide an improved loader for a gear burnishing machine, the loader including a carrier having a pair of spaced retainers and a retaining shaft having an extended position and a retracted position, the retaining shaft extending from one of the retainers toward the other retainer in its extended position so as to be received by a central opening in a gear that is fed therebetween by a hopper so as to permit gear rotation as the gear is moved by the carrier to a start position between gear racks of the burnishing machine, and wherein a guide engages the teeth of a gear moved by the carrier such that the teeth of the gear are meshed with one of the gear racks of the burnishing machine in the start position.

In carrying out the above objects and other objects of this invention the preferred embodiment of the loader includes a feed mechanism for feeding gears from the hopper to the carrier. A movable dog is positioned below a vertical column of the gears in the hopper and a movable retaining member is positioned above the dog to cooperate in feeding gears to the carrier. Control units such as air cylinders move the dog and the retaining member such that the dog releases the lowest gear as the retaining member holds the rest of the gears against downward movement. Control units such as air cylinders also move the retaining shaft on the carrier between its retracted and extended positions and the carrier between a load position adjacent the hopper and the start position adjacent the burnishing machine.

After burnishing, the carrier moves the gear back to the load position adjacent the hopper and a delivery unit that preferably includes an inclined ramp. The burnished gear is then released by the retaining shaft and an actuator including a movable pusher is operated to push the burnished gear off the guide rack onto the delivery ramp.

In the preferred embodiment disclosed, the carrier moves two gears between three spaced retainers as the gears are allowed to rotate while engaged with teeth on the guide rack so as to be oriented to mesh with one of the gear racks of the burnishing machine. Gears with both helical and straight teeth can be loaded by the loader.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is an elevation view of a burnishing machine which receives gears to be burnished and is partially broken away showing portions of a gear loader constructed according to the invention;

FIG. 2 is a plan view of the burnishing machine taken partially in section along line 2—2 of FIG. 1 showing two pairs of gears loaded in the gear burnishing machine;

FIG. 5 is a partial perspective view of the burnishing machine which receives gears to be burnished from the loader of FIGS. 3 and 4 and which shows one of the two guide racks of the loader; and FIG. 6 is a side elevational view in cross section of a gear captured on a retaining shaft of the loader.

BEST MODE FOR CARRYING OUT THE INVENTION

Figure 3:
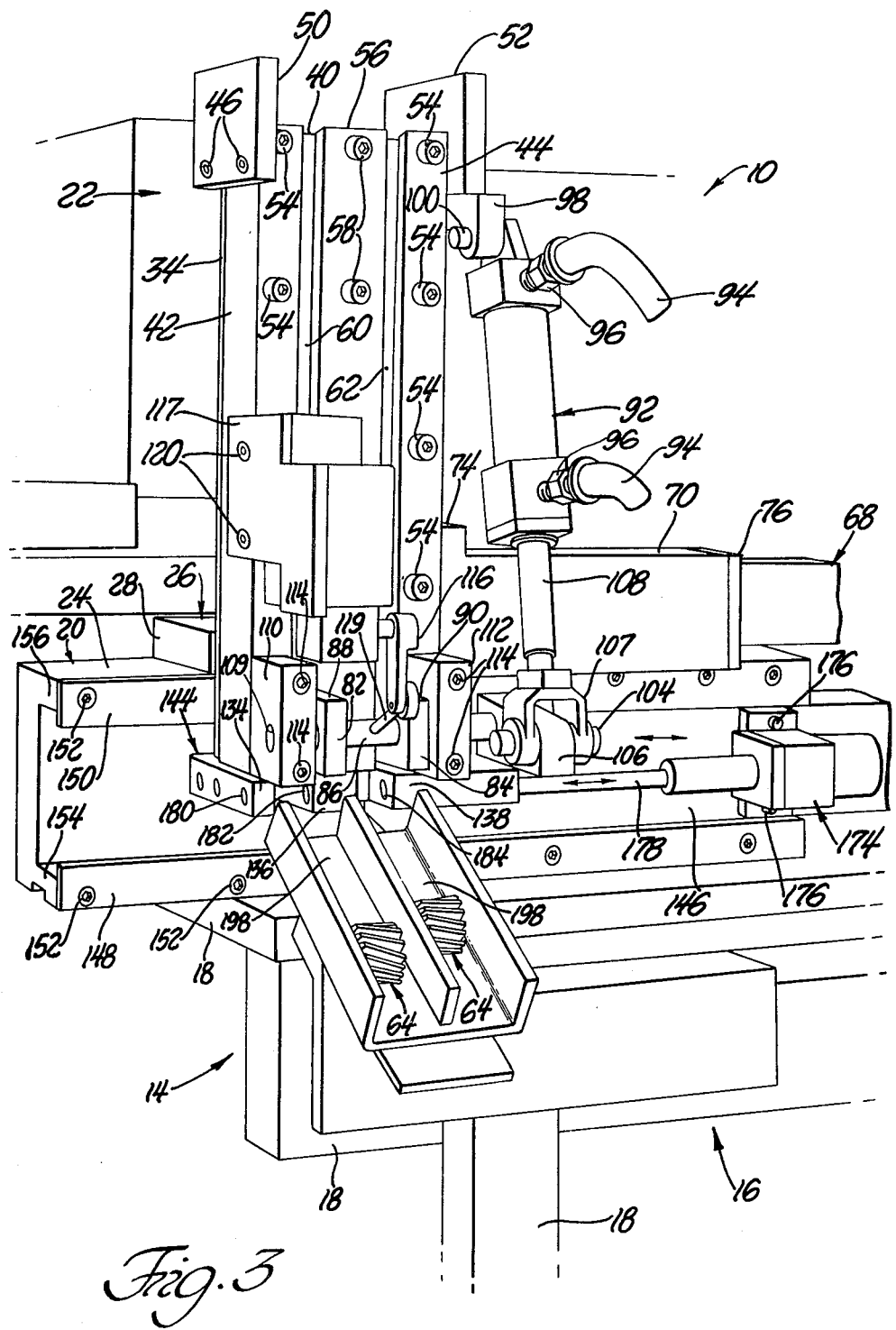
FIG. 3 is a perspective view of one hopper and its respective carrier of the loader of this invention.

Referring now to the drawings there is shown an illustrative embodiment of the invention of a loader for loading rotary gears into a gear burnishing machine.

Figure 4:
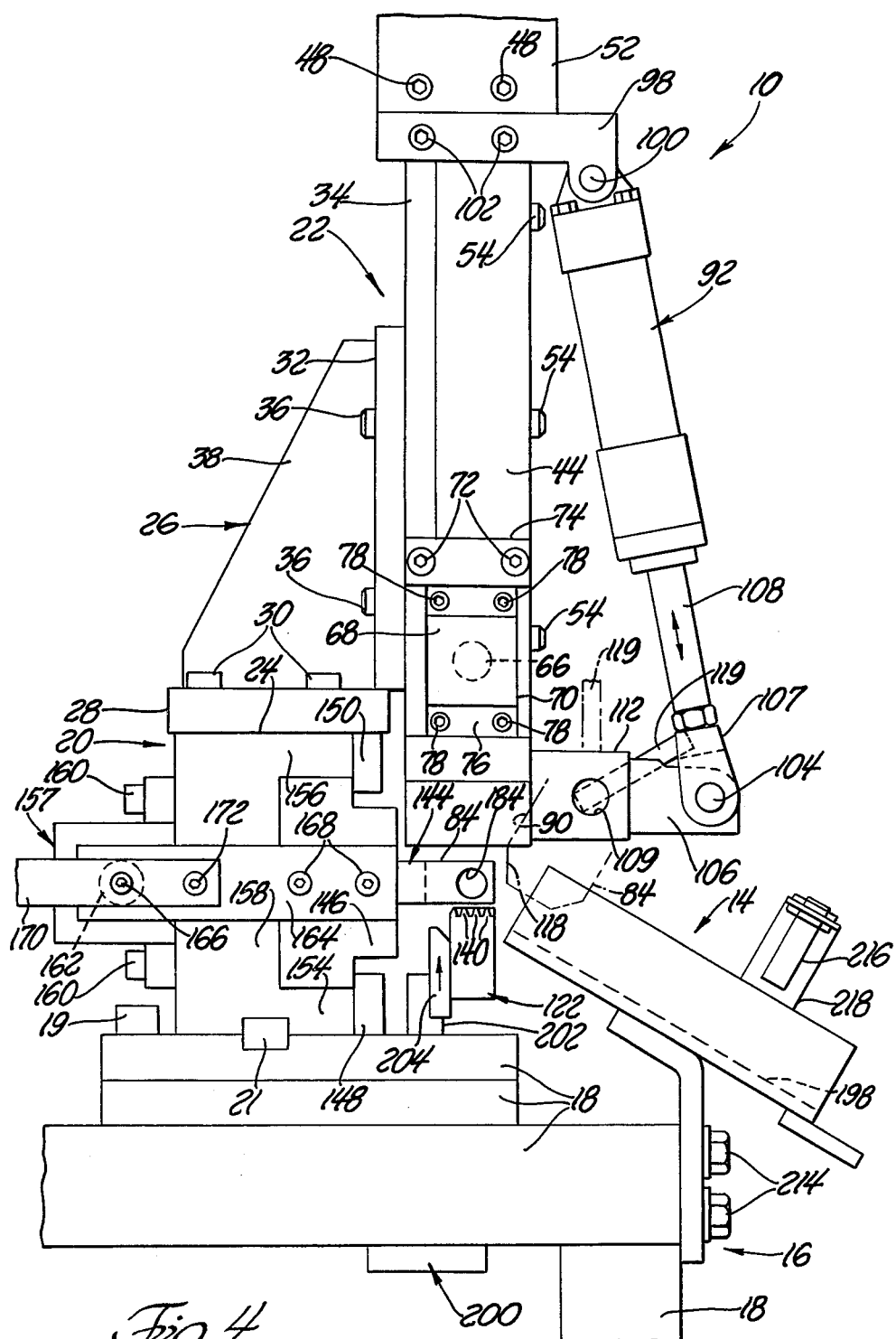
FIG. 4 is a side elevational view of a second hopper and its respective carrier identical to the hopper and carrier of FIG. 3 partially broken away and showing in phantom the position of the structure when dropping a gear.

Apparatus for burnishing gears is illustrated in the drawings and includes a loader generally indicated at 10 in FIGS. 3 and 4 and a gear burnishing machine generally indicated at 12 in FIGS. 1 and 5. It is to be understood that the apparatus as shown in FIG. 3 is not the same apparatus as shown in FIG. 4 but rather are different parts of the same loader 10. However, one of these parts of the loader is the mirror image of the other part, or, in other words, is substantially identical to the other part. Because of this, the elements of the loader 10 shown in FIG. 3 will be given the same reference numerals as the mirror image elements of the loader 10 shown in FIG. 4. Futhermore, the following description of the best mode will proceed as if the loader 10 comprised apparatus sufficient only to load gears to one-half of the burnishing machine 12 shown in FIGS. 1 and 2. However, it is to be understood that parts of the loader 10 load both halves of the burnishing machine 12 in the same fashion.

Gears to be burnished are positioned on the loader 10 for loading and subsequent burnishing by the burnishing machine 12 prior to delivery to a delivery means or a delivery unit generally indicated at 14 in a manner that is more fully hereinafter described.

With reference to FIGS. 3 and 4 the loader 10 includes a base generally indicated at 16 comprising various frame members 18 of angle sections, square tubular sections and plate like shapes which are welded and bolted together such as by bolts 19 only one of which is shown in FIG. 4.

The loader 10 also includes a C-shaped slide holder generally indicated at 20 which is attached to the remainder of the base 16 by a key 21 as shown in FIG. 4 and thereafter welding the slide holder 20 to the base 16.

The loader 10 also includes a hopper generally indicated at 22 for storing gears to be burnished. The hopper 22 is fixedly mounted at the top surface 24 of the slide holder 20 by a weldment generally indicated at 26 which comprises an L-shape bracket having a lower member 28 bolted at the top surface 24 of the slide holder 20 by bolts 30 only two of which are shown. The lower member 28 is welded to a vertical member 32 of the weldment 26 which in turn is bolted to a back wall 34 of the hopper 22 by bolts 36 only two of which are shown. The weldment 26 also includes a triangular member 38 which is welded to both the lower member 28 and the vertical member 32 to thereby space the two members 28 and 32 and hold them at a substantially 90° angle to provide support for the hopper 22.

The hopper 22 further includes a rectangularly shaped central member 40 (FIG. 3) to which upwardly extending spaced side hopper members 42 and 44 are connected by bolts 54. The members 42 and 44 are both L-shaped in section along their longitudinal vertical axes.

The spaced side members 42 and 44 are also connected by bolts 46 and 48, respectively, as shown in FIGS. 3 and 4 to spaced plate members 50 and 52, respectively, and the back wall 34. The plate 50 is mounted to the side member 42 and the back wall 34 by the bolts 46 one of which extends through the side member 42 and the other of which extends into the back wall 34. In the same fashion, the plate member 52 is mounted on the back wall 34 and the side member 44, one of the bolts 48 extending into the back wall 34 and the other of the bolts 48 extending through the side member 44.

As previously mentioned, both of the side hopper members 42 and 44 are bolted to the central member 40 by bolts 54 which extend through the side members 42 and 44, through lateral sides of the central member 40 and into the back wall 34. A central member 56 centrally spaced between the side members 42 and 44 extends vertically and is likewise bolted to the central member 40 and the back wall 34 by bolts 58.

The side members 42 and 44 together with the central member 56 define a pair of vertical storage areas 60 and 62, respectively, shown in FIG. 3. Apertured rotary gears to be burnished, such as the ones shown in FIGS. 1, 2, 3 and 6 are stored in vertical columns in the areas 60 and 62, the central axes of the gears 64 being coincident with the centers of the circular openings or apertures extending therethrough and being parallel and spaced with respect to each other in their stored positions.

The lowermost gear in each of the vertical columns in the storage areas 60 and 62 is held by a feed mechanism which comprises a retaining member which is shown in phantom in FIG. 4 at 66. The retaining member 66 is connected to a control unit such as an air cylinder generally indicated at 68 (FIGS. 3 and 6) which includes a cylinder block 70 that is secured to the side member 44 by bolts 72 extending through a flange 74 of the cylinder block 70. A face plate 76 covers the end of the cylinder block 70 opposite the end of the cylinder block 70 mounted on the side hopper member 44. The cover plate 76 is bolted at the end of the cylinder block 70 by bolts 78 as shown in FIG. 4.

During operation of the loader 10 the cylinder 68 is supplied with pressurized air so that a piston connected to the retaining member 66 within the cylinder block 70 is driven to the left and the right as viewed in FIG. 3 in order to hold the lowermost gears of the columns of the stored gears and thereafter release the lowermost gears of the columns of stored gears, respectively. In other words, upon extension of the retaining member 66 the lowermost gears in each of the two columns of gears stored in the areas 60 and 62 are held by the retaining member 66 which extends through apertures (not shown) in the side hopper members 44 and 42 and the central hopper member 56 into the areas 60 and 62 and through the apertures 80 of the gears 64 shown in FIG. 6.

Upon retraction of the retaining member 66 to the right as viewed in FIG. 3, each of the columns of stored gears moves downwardly within their respective areas 60 and 62 a distance approximately equal to the diameter of the gears 64 at which point the lowest gear 64 in each column engages an associated movable dog 82 or 84 mounted in a spaced relationship on a shaft 86 extending therethrough. The horizontal distance between the dogs 82 and 84 is substantially equal to the horizontal distance between the areas 60 and 62. Furthermore, the width of the top surface 88 and 90 of the dogs 82 and 84, respectively, is slightly less than the width of the areas 60 and 62 so that the dogs 82 and 84 fit within the areas 60 and 62, respectively. The dogs 82 and 84 support the gears 64 previously released at their top surfaces 88 and 90, respectively, when the retaining member 66 is in its retracted position.

After the gear columns drop so that the lowest gears in the columns rest on the top surfaces 88 or 90 of the dogs 82 and 84, respectively, cylinder 68 extends the retaining member 66 so that it extends through the opening in the second lowest gear of each column.

The loader 10 further comprises a control unit in the form of an air cylinder generally indicated at 92 which is selectively supplied with pressurized air through hoses 94 at associated connectors 96 to extend or retract the cylinder. One end of the cylinder 92 is pivotally connected to one end of an end bracket 98 about a pivot pin 100, and the opposite end of the end bracket 98 is bolted to the back wall 34 and the side hopper member 44 by bolts 102 as shown in FIG. 4. The other end of the cylinder 92 is pivotally connected about a pivot pin 104 to one end of an eye plate 106 by means of a clevis 107 through which the pin 104 extends and which is attached to rod or shaft 108 of the cylinder 92. At the opposite end of the eye plate 106 the shaft 86 extends therein and is fixedly mounted at one of its ends to rotate with the eye plate 106 about the longitudinal axis of the shaft 86.

The shaft 86 also extends through apertures 109 (only one of which is shown in FIG. 4) formed through a pair of support blocks or members 110 and 112 which are bolted to their associated hopper members 42 and 44, respectively, by bolts 114.

Also connected to the shaft 86 between the dogs 82 and 84 is a control link 119 that operates an arm 116 of a first limit valve as well as an unshown arm of a second limit valve. Both limit valves are supported within a housing 117 that is mounted to the hopper member 42 by bolts 120. The housing 117 is shown without its fluid connectors in FIG. 3. The operation of the limit values in housing 117 controls operation of the feed mechanism as will be described in greater detail hereinafter.

The supply of air to the cylinder 92 is coordinated with the operation of the loader 10 so that the rod 108 is retracted to move upwardly within the cylinder 92 after the retaining member 66 has been extended through the second lowest gear in each of the columns of stored gears. When the rod 108 is retracted the eye plate 106 pivots upwardly about the longitudinal axis of the shaft 86 and thereby also causing dogs 82 and 84, both of which have inclined or sloping end surfaces 118 extending from their respective top surfaces 88 and 90 as shown in FIG. 4, to pivot downwardly about the shaft 86 and also causing the link 119 to move to a substantially vertical position as shown in phantom in FIG. 4 so as to actuate the unshown limit valve and terminate the cylinder retraction.

This downward movement of the dogs 82 and 84 causes the lowest gear in each column to be dropped onto the outer end of a guide embodied by a guide rack not shown in FIG. 3 but generally indicated at 122 in FIGS. 1, 2, 4, and 5. The guide rack 122 is fixedly supported in a vertical and horizontal fashion by a guide base generally indicated at 124 in FIG. 5 and including various base members 126 which are adjustably connected together by bolt and slot connections 128 and keys 127. A triangular base member 123 of base 124 is welded to a horizontal base member 126 and to a vertical base member 126 to fixedly secure these base members together at an angle of 90°.

In use, the guide rack 122 is adjusted to extend between the top surface of the end 130a of the lower rack 130 of the burnishing machine 12 and a load position at which point the gears 64 are dropped on the end 132 of the guide rack 122 opposite the racks 130. The guide rack 122 includes a plurality of guiding teeth 140, as best shown in FIGS. 1, 2, 4 and 5 which are adpated to meshingly engage the teeth 142 of the gears 64 when the gears 64 move thereon as will be described in greater detail hereinafter.

The gears 64 are dropped between retainers 134, 136 and 138 (FIG. 3) which are spaced from each other a distance at least slightly greater than the longitudinal length of the gears 64 so as to be capable of receiving the gears. The retainers 134, 136 and 138 are part of a carrier indicated at 144. The carrier 144 is bolted to a slide member 146 which, in turn, is adapted for sliding movement within the slide holder 20 between a pair of keepers 148 and 150 fixedly mounted by bolts 152 to the lower upper legs 154 and 156, respectively, of the C-shaped holder 20.

A control unit in the form of an air cylinder generally indicated at 157 in FIG. 4 is fixedly mounted to a vertical portion 158 of the slide holder 20 by bolts 160. A piston (not shown) of the cylinder 157 is connected to one end of a rod or shaft 162 shown in phantom in FIG. 4. The opposite free end of the rod 162 is fixedly connected to a rigid strap 164 by a bolt 166. In turn, the strap 164 is fixedly connected at the end of the slide member 146 farthest from the hopper 22 as shown in FIG. 3 by means of bolts 168 (FIG. 4). Also mounted on the rod 162 and on the strap 164 is a bracket 170 which extends away from the strap 164 and which is mounted thereon by the bolt 166 and a bolt 172.

During operation of the loader 10, the cylinder 157 is supplied with pressurized air so that the piston connected to the shaft 162 is driven to the left and to the right as shown in FIG. 3 in order to reciprocally move the slide member 146 and the gear carrier 144 mounted thereon within the slide holder 20. The bracket 170 is provided to alternately engage and disengage a pair of unshown limit valves to indicate the extreme positions of travel of the slide member 146 and to thereby initiate control signals so that the supply of the air to the cylinder 157 is coordinated with operation of the loader 10.

Also mounted on the slide member 146 is a control unit in the form of an air cylinder generally indicated at 174 which is mounted on the slide member 146 by bolts 176 to move therewith as shown in FIG. 3. A retaining shaft 178 is connected to a piston of the cylinder 174 such that when the cylinder 174 is supplied with pressurized air the piston connected to the shaft 178 is driven to the left and to the right to move the retaining shaft through apertures 180, 182 and 184 extending through the retainers 134, 136 and 138, respectively, as shown in FIG. 3. When the shaft 178 is extended, gears 64 between the retainers are captured therein as shown in FIG. 6 by the shaft 178, the gears 64 being allowed to rotate thereabout the retaining shaft 178 without being supported by it.

When the retaining shaft 178 is moved to its extended position to capture the gears 64, an unshown sensor senses such extension and through control circuitry actuates retraction of cylinder 157 to move slide member 146 and the gear carrier 144 as well as a pair of gears 64 to the left as viewed in FIG. 3. During this movement which is lateral with respect to the gear racks 130, the teeth 142 of the gears 64 meshingly engage the teeth 140 of the guide rack 122 thereby causing the gears 64 to rotate about the shaft 178 to orient the teeth 142 of the gears 64 under the control of the teeth 140 formed on the guiding face 139 of the guide rack 122. The teeth 140 are so positioned on the guide rack 122 so as to orient or move the teeth 142 of the gears 64 during the movement so that, when the gears 64 enter the space between the lower gear racks 130 and the upper gear racks 131, the gear teeth mesh with the teeth of the lower racks 130. Prior to the initial gear rack movement, the gear racks are in an end-to-end relationship, as opposed to the slightly overlapped relationship shown in FIG. 1, so that the gears 64 are not initially meshed with the upper racks 131.

As the cylinder 157 moves the gears 64 to their start positions meshed with the lower racks 130, the bracket 170 (FIG. 4) engages a limit valve (not shown) which stops the movement of the cylinder 157 and thereby the gear carrier between the upper and lower gear racks 131 and 130, respectively. Also at this time, the gears 64 are still located between the carrier retainers 134, 136 and 138, the carrier retainers 136 and 138 having engaged the gears 64 to push the gears 64 along the guide rack 122. Furthermore, the shaft 178 still has the gears 64 in their captured positions but able to rotate thereabout.

All of the gear racks 130 and 131 are located in a work space 186 of the burnishing machine 12. This work space 186 is defined by a lower floor mounted base portion 188 and an upper base portion 190 and a pair of connecting columns 191 as shown in FIGS. 1, 2 and 5. After the gears 64 are placed in their start positions meshed with the leading ends 130a of the lower gear racks 130, a drive mechanism such as the drive mechanism as shown in U.S. Pat. No. to Anderson 4,080,699 is actuated to move the gear racks into an overlapping relationship that meshes the teeth of the upper rack 131 with the teeth 142 of the gears 64. Both racks 130 and 131 are thus meshed with the gear teeth 142 in order to provide a burnishing operation.

Each of the gear racks 130 and 131 are supported by their associated slide way members 192. Bolts 194 secure the gear racks 130 and 131 to their associated slide way members 192 as best shown in FIG. 5. The slide way members 192 are respectively slidably mounted on the slide ways of the machine base portions 188 and 190 for movement along the direction of arrows a, b, c, and d as shown in FIG. 1.

As the drive mechanism of the burnishing machine 12 drives the gear racks 130 and 131 with gears 64 meshed with both racks as shown in FIGS. 1 and 2, the meshing relationship provides the sole support for the gears 64 as they rotate about the retaining shaft 178, without the shaft 178 engaging the inner opening surfaces of the gears 64. Any nicks, surface roughness or other defects of the gear teeth 142 are removed by the burnishing machine 12 to improve the quality of the gears 64 by eliminating noise during use as well as lengthen the average service lifetime of the gears 64. This burnishing is carried out on both sides of the gear teeth 142 as a result of the reciprocal driving of the gear racks 130 and 131 by the drive mechanism.

The gears 64 stay in the same location rotating about the retaining shaft 178 as the gear teeth 142 mesh with the rack teeth. Upon the reverse driving of the gear racks 130 and 131, the gears 64 will likewise stay in the same location and remain in meshing arrangement with the teeth of the upper and lower gear racks 131 and 130, respectively.

After the gears 64 have been burnished the cylinder 157 is extended to move the captured gears 64 off the lower gear racks 130 and along the guiding face 139 of the guide rack 122 until the gears 64 are in alignment with ramps 198 of the delivery unit 14. Retainers 134 and 136 engage the gears 64 to move the gears 64 therealong the face 139 of the guide rack 122. In the fully extended position of the cylinder 157 the bracket 170 engages one of the previously described limit valves to provide a control signal. This control signal is utilized by suitable control circuitry which interconnects the operation of all of the previously described cylinders to coordinate their operation during loading and unloading the gears 64. The control circuit uses this control signal to retract the retaining shaft 178 of cylinder 174. After the gears 64 are no longer captured by the retaining shaft 178, an actuator including an air cylinder generally indicated at 200 in FIG. 4 is supplied with pressurized air so that a piston connected to a rod 202 is driven upwardly to move a pair of pushers 204 (only one of which is shown) fixed thereto and disposed immediately adjacent the guide rack 122. The pusher movement is in an upward direction so as to push the burnished gears 64 onto the ramps 198 for delivery to a suitable storage bin.

As shown in FIG. 5, the guide rack 122 includes a pair of passages 208 and 210 which are fed by an air line 212 that is adapted to be connected to an air pressure source (not shown). The air passages 208 and 210 are disposed immediately below the gears when the gears are in alignment with their respective ramps 198 to allow air from the air pressure source to help push the burnished gears off the guiding face 139 of the guide rack 122 at the same time the pushers 204 move upwardly to push the gears 64 off the guide rack 122. The gears move off the guide rack at its end 132 where the teeth 140 are relieved to facilitate such movement.

The delivery unit 14 is fixedly mounted to one of the members 18 of the base 16 by bolts 214 as shown in FIG. 4. Micro switches 216 (only one of which is shown in FIG. 4 and not shown in FIG. 3) are mounted above their respective ramps 198 by spaced mounting plates 218 to engage, then release, the burnished gears 64 as they roll downwardly along the ramps 198. The control circuit of the loader 10 is responsive to these signals generated by the micro switches 216 to prevent the loading of two additional gears 64 to be burnished before the previously burnished gears are delivered to the ramps 198. In other words, the micro switches 216 provide control signals to begin the loading and burnishing process over again as previously described.

It should be noted that the actual burnishing operation is the same as that described in U.S. Pat. No. 4,080,699, and the entire disclosure thereof is hereby incorporated by reference.

Also it should be understood that the loader 10 is equally operable to load gears with straight teeth as well as the helical teeth shown in order to provide burnishing in the manner described.

While the preferred embodiment of the loader for a gear burnishing machine has been shown and described herein in detail, those skilled in this art will recognize various alternative designs and embodiments for practicing the present invention as defined by the following claims.

What is claimed is:

1. A loader for a gear burnishing machine including a pair of elongated gear racks mounted for movement in opposite directions relative to each other and having teeth for meshing with a toothed gear to be burnished such that the meshing provides the sole support for the gear, the loader comprising:
   a hopper for storing toothed gears to be burnished;
   a carrier for sequentially moving at least one gear at a time from the hopper to the burnishing machine; and
   a guide for engaging the teeth of a gear on the carrier during movement thereof to a start position between the gear racks so as to provide meshing of the gear with at least one of the gear racks of the burnishing machine.

2. The loader as claimed in claim 1 wherein said carrier includes a pair of spaced retainers for receiving a gear therebetween so as to position the gear on the carrier while allowing rotation thereof during carrier movement to the start position.

3. The loader as claimed in claim 2 wherein said carrier includes a retaining shaft having an extended position and a retracted position, and said retaining shaft extending from one of the retainers toward the other retainer in the extended position thereof so as to be received within a central opening in the gear in order to position the gear while permitting gear rotation.

4. The loader as claimed in claim 3 wherein at least one of said retainers has an aperture that receives the retaining shaft in its extended position.

5. The loader as claimed in claim 3 or 4 further including a base, and wherein the carrier includes a slide member that is slidably supported on said base and supports the retainers and the retaining shaft for movement between a load position and the start position, and the carrier being positioned to receive a gear from the hopper between the retainers thereof in the load position.

6. The loader as claimed in claim 1 or 3 wherein said guide includes a guide rack having a guiding face with teeth spaced therealong for meshing with the teeth of the gear during the carrier movement to the start position to orient the gear for meshing thereof with one of the gear racks of the burnishing machine.

7. The loader as claimed in claim 6 further including an actuator for moving a burnished gear from between the retainers of the carrier with the retaining shaft in its retracted position, and a delivery unit for receiving the burnished gear from the carrier upon operation of the actuator with the carrier moved back from the burnishing machine to a load position adjacent the hopper.

8. The loader as claimed in claim 7 wherein said actuator includes a movable pusher disposed adjacent said guide rack to push the burnished gear off the guide rack with the carrier in the load position adjacent the hopper.

9. The loader as claimed in claim 8 wherein said guide rack has at least one internal passage adapted for connection to an air pressure source and extending through the guiding face of the guide rack for allowing air from the air pressure source to push the burnished gear off the guide rack.

10. The loader as claimed in claim 8 wherein said delivery unit includes a downwardly inclined ramp mounted adjacent said guide rack such that burnished gears are received thereby from the carrier to roll downwardly along the ramp.

11. The loader as claimed in claim 5 wherein the hopper includes a pair of vertically extending hopper members that are spaced from each other to store gears to be burnished in a vertical column, and the loader further including a feed mechanism for feeding the lowermost gear of the column of stored gears to between the retainers of the carrier.

12. The loader as claimed in claim 11 wherein the feed mechanism includes a dog below the column of stored gears.

13. The loader as claimed in claim 12 wherein the feed mechanism includes a retaining member positioned above the dog, and the loader further including a control unit for reciprocally moving the retaining member relative to the hopper members in order to alternately hold and release the column of stored gears.

14. The loader as claimed in claim 13 further including a control unit for moving said dog relative to the hopper members so as to alternately support and drop a gear from the hopper onto the guide between the retainers of the carrier.

15. The loader as claimed in claim 14 further including a control unit for reciprocally moving said slide member on the base relative to the gear racks.

16. The loader as claimed in claim 15 further including a control unit mounted on said slide member for reciprocally moving said retaining shaft relative to the slide member between its extended and retracted positions.

17. A loader for a gear burnishing machine including at least two pairs of elongated gear racks mounted for movement in opposite directions relative to each other and having teeth for meshing with toothed gears to be burnished such that the meshing provides the sole support for the gears, the loader comprising:
   a hopper for storing gears to be burnished;
   a carrier for sequentially moving two gears at a time from the hopper to the burnishing machine; and
   a guide for engaging the teeth of the gears on the carrier during movement thereof to a start position between the gear racks so as to provide meshing of the gears with at least one of the gear racks of the burnishing machine.

18. The loader as claimed in claim 17 wherein said carrier includes three spaced retainers between which two gears are received from the hopper for movement to the burnishing machine.

19. The loader as claimed in claim 17 or 18 wherein said guide includes a guide rack having a guiding face with teeth spaced therealong for meshing with the teeth of the gears during the carrier movement to the start position to orient the gears for meshing thereof with at least one of the gear racks of the burnishing machine.

* * * * *